June 3, 1947.   W. M. HAWKINS   2,421,694
AIRPLANE CONTROL SURFACE
Filed July 2, 1942   3 Sheets-Sheet 1
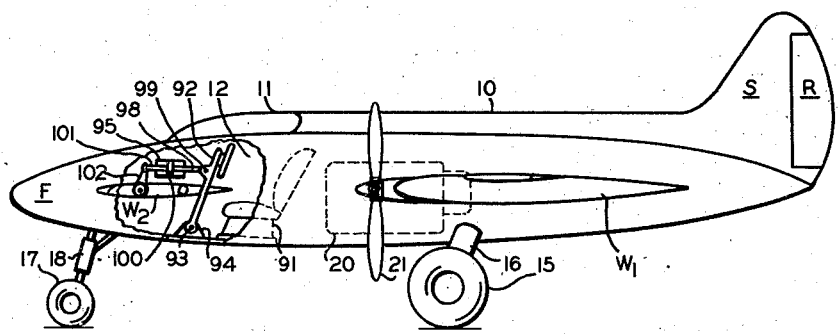
FIG—1
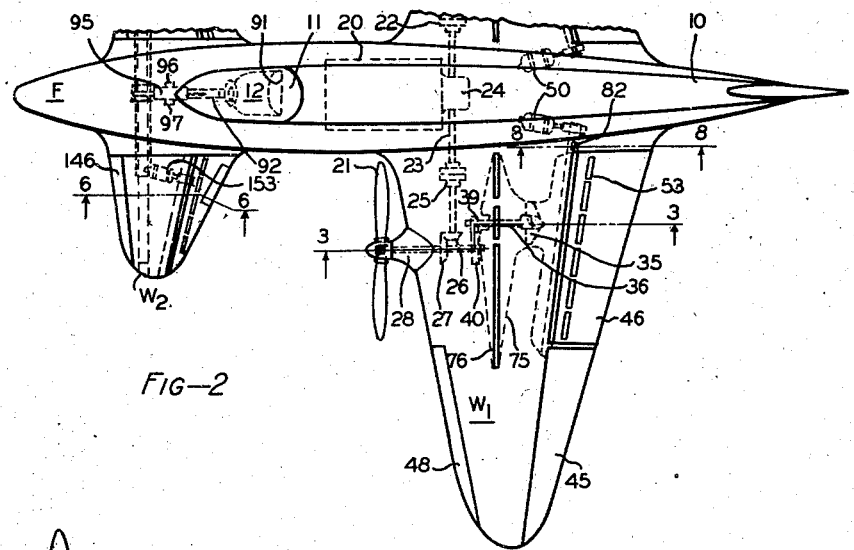
FIG—2
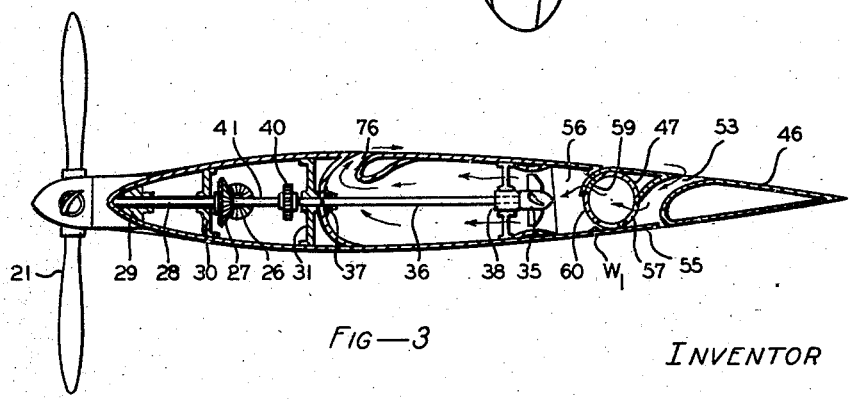
FIG—3
INVENTOR
WILLIS M. HAWKINS
BY George Sullivan June 3, 1947.  W. M. HAWKINS  2,421,694
AIRPLANE CONTROL SURFACE
Filed July 2, 1942  3 Sheets-Sheet 2
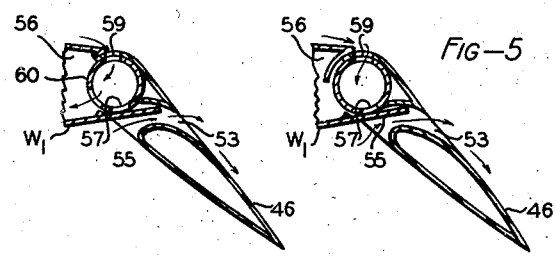
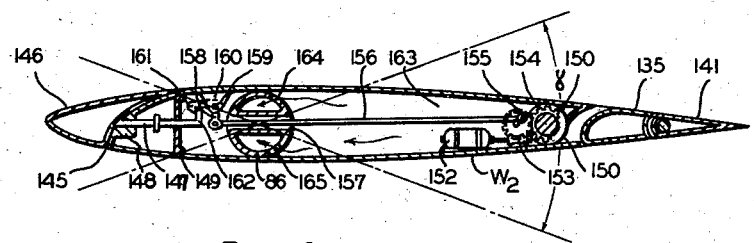
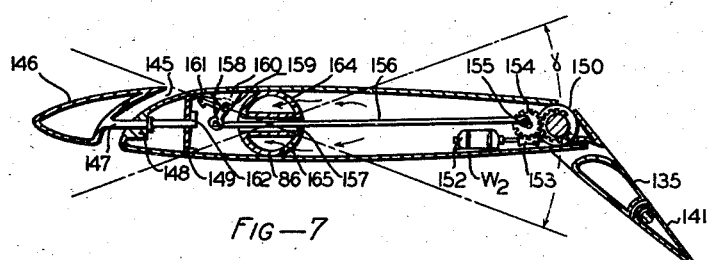
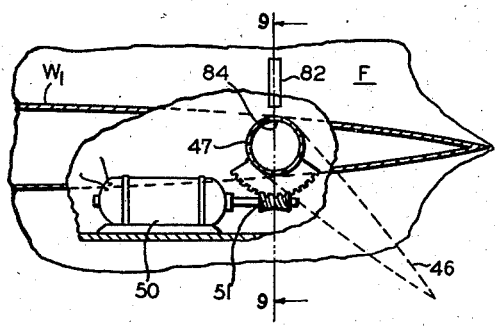
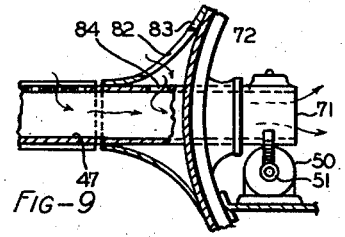
INVENTOR
WILLIS M. HAWKINS
BY George C. Sullivan June 3, 1947.  W. M. HAWKINS  2,421,694
AIRPLANE CONTROL SURFACE
Filed July 2, 1942  3 Sheets-Sheet 3
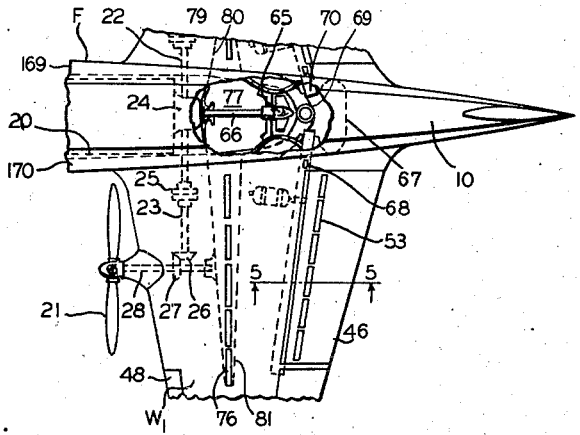
FIG—10
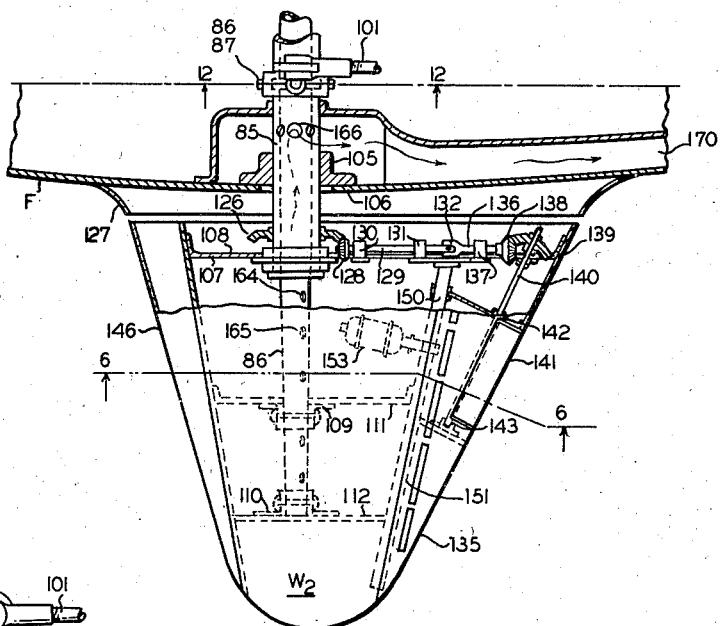
FIG—11
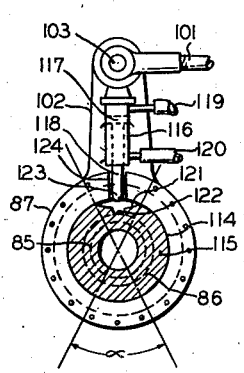
FIG—12
INVENTOR
WILLIS M. HAWKINS
BY George C. Sullivan Patented June 3, 1947

2,421,694

UNITED STATES PATENT OFFICE 2,421,694

AIRPLANE CONTROL SURFACE

Willis M. Hawkins, North Hollywood, Calif., assignor to Lockheed Aircraft Corporation, Burbank, Calif.

Application July 2, 1942, Serial No. 449,431

3 Claims. (Cl. 244—75)

This invention relates in general to improvements in aircraft and more particularly to improvements in the arrangement, form and method of operation of airfoils and control surfaces of airplanes whereby speeds and efficiencies of flight may be increased. This invention relates more specifically to an airplane adapted to be flown at air speeds in the region of sonic or supersonic velocities.

In the conventional arrangement of airfoils in which the horizontal stabilizer is positioned to the rear of the main wing the airplane must necessarily be designed for a wing load factor which includes not only the weight of the aircraft but also the down load upon the horizontal stabilizer, whereas in the type of airplane of the present invention in which the trimmer or horizontal stabilizer is located forward of the main wing, the wing load factor may always be less than the airplane load factor. Also, in the present invention the maximum coefficient of lift of the airplane as a whole under conditions approaching stalling speeds is increased by reason of the fact that under such conditions the trimmer or horizontal stabilizer forces are always positive lifting forces which aid in sustaining the airplane as contrasted with those in the conventional airplane in which the stabilizer load is negative and must be borne by added lift on the main wing. Similarly in the forwardly located stabilizer airplane of the type of this invention the loading on the landing gear, particularly under take-off conditions is materially less than is generally possible with the conventional airplane.

In designing an airplane for extremely high speeds, it is necessary to reduce the total wing area to the absolute minimum required for practical take-off and landing speeds in order to maintain the parasitic drag at the lowest possible value. In so doing, it is manifestly desirable to utilize all of the sustaining surfaces in the most efficient manner insofar as obtaining the maximum possible lift to drag ratio of the airplane is concerned. As stated hereinbefore, in the conventional type of airplane where the horizontal stabilizer is located to the rear of the main wing, it is necessary for the airplane to carry a main wing having sufficient area to carry the weight of the airplane plus the down load on the stabilizer whereas in the type of airplane of the present invention when the horizontal stabilizer is located forward of the main wing it is only necessary for the main wing to have sufficient area to carry a load equal to the weight of the airplane minus the up load on the said stabilizer.

It is apparent, therefore, that for a given airplane weight the one employing a forwardly located stabilizer can carry the smallest wing area and hence is potentially the fastest airplane.

In order to impart the required stability characteristics to a forward stabilizer type of airplane such as the present one, the forward stabilizer must be of low aspect ratio in plan form with respect to the main wing, in order to obtain a lower slope of curve, and to delay the point of stall thereof. In employing a low aspect ratio stabilizer, high maximum angles of attack of such stabilizer are required to maintain balance in pitch at low speeds such as those occurring at the time of landing, such angles being substantially greater than the allowable landing or launching angle of the airplane as a whole. In order to meet this requirement it was found that merely increasing the effective angle of incidence and camber of the forward wing by lowering a trailing edge flap was insufficient to maintain balance of the diving moments of the airplane about its center of gravity at the minimum required speeds and in order to fully meet the requirements of the low aspect ratio forward wing in regard to increased coefficient of lift necessary to maintain such balance it was found necessary additionally to provide means for pivoting the whole forward wing about its spanwise axis to enable the angle of incidence to be greatly increased. In addition to this increase in angular movement it was found to be desirable to provide a boundary layer control of novel design to prevent stalling of the wing at the required increased angles of attack.

One of the objects of this invention as before stated, is to provide an airplane capable of attaining air speeds of sonic and supersonic velocity. At these velocities it has been discovered that conditions are encountered in which unexpected changes in the lift characteristics of the airfoils occur. For example, it was discovered that control of the airplane by means of a conventional type of stabilizer comprising a fixed leading portion and a movable trailing elevator flap portion became ineffective at airspeeds in the region of sonic velocities and that the angle of attack of the leading edge portion of the airfoil appeared to become the controlling factor in changing the stabilizer lift.

Therefore, in order to maintain control and balance of the present airplane when flying at airspeeds in the beforementioned critical range, it was necessary to provide a horizontal stabilizer, the leading edge portion of which could be varied in angle of attack to effect the necessary variations in lift.

Accordingly, an object of the present invention is primarily to provide an airplane of superior aerodynamic characteristics and adapted to fly at speeds exceeding those heretofore possible with airplanes of conventional type and construction.

A further object of the present invention is to provide an airplane adapted to operate at sonic and supersonic airspeeds.

It is a further object of the present invention to provide an airplane in which adequate control may be maintained both under the critical conditions obtaining at air-speeds approaching supersonic velocity and at low speeds approaching the stall as when landing.

It is a further object to provide an airplane of improved design in which a novel arrangement of airfoils and improved high lift devices are employed to increase the speed range beyond that heretofore possible in conventional high speed airplanes.

It is a still further object of the present invention to provide improved airfoil boundary layer control.

The invention by means of which the aforesaid objects are attained resides in general in an airplane structure in which a horizontal stabilizer or trimmer is located on the fuselage in a position forward of the main wing and in which the said forward wing has an area and aspect ratio which is low as compared with the main wing, is provided with high lift devices adapted to effect a considerable increase in its maximum lift coefficient and is also provided with means to vary the angle of incidence of the whole of the said forward stabilizer with respect to the longitudinal axis of the fuselage. The invention more specifically resides in an airplane utilizing a low aspect ratio, forwardly located horizontal stabilizer airfoil incorporating boundary layer control and means to increase the effective camber together with means to vary the angle of attack of said stabilizer beyond the normal maximum angle of attack of the main wing and the airplane as a whole.

The invention further resides in improved means for increasing the maximum effective coefficient of lift of airfoils including depressable trailing edge wing flaps of increased efficiency and effectiveness incorporating slots adapted to automatically effect the control of the boundary layer associated therewith.

Other objects and features of novelty will be evident hereinafter.

In the accompanying drawings wherein like reference characters refer to similar parts throughout the several views and wherein preferred embodiments of the invention are shown by way of illustration;

Figure 1 is a side elevation of the airplane.

Figure 2 is a fragmentary plan view of the airplane showing the general arrangement of fuselage, wings and control surfaces.

Figure 3 is a cross-section of the main wing taken at 3—3 of Figure 2 and with the trailing edge flap in a fully retracted position.

Figure 4 is an enlarged fragmentary cross-sectional detail of the trailing edge flap of Figure 3 showing the flap in a fully lowered position.

Figure 5 is an enlarged fragmentary cross-sectional detail of an optional construction of the trailing edge flap taken on line 5—5 of Figure 10.

Figure 6 is a typical cross-section of the forward wing taken at line 6—6 in Figures 2 and 10 with the trailing edge flap up.

Figure 7 is a typical cross-section of the forward wing taken at line 6—6 in Figures 2 and 10 with the trailing edge flap down.

Figure 8 is an enlarged fragmentary cross-sectional view of the main wing flap torque tube and actuating mechanism taken on line 8—8 of Figure 2.

Figure 9 is a cross-sectional view taken on line 9—9 of Figure 8 showing the location of a wing fillet slot.

Figure 10 is a fragmentary plan view of the airplane similar to Figure 2 showing an optional arrangement of the boundary layer air withdrawal system.

Figure 11 is an enlarged detail of the forward horizontal stabilizer actuating mechanism.

Figure 12 is a cross-section taken on line 12—12 of Figure 11.

The apparatus is as follows:

Referring primarily to Figures 1 and 2 in which the general arrangement of the elements of the airplanes are illustrated, F is a closed streamlined body or fuselage carrying a rigidly attached, rearwardly located main wing $W_1$, of relatively large area and a forwardly located pivoted horizontal stabilizer or forward wing $W_2$ of relatively small area and reduced aspect ratio with respect to the said main wing. A vertical stabilizer S and rudder R are located upon the rear portion of the fuselage to the rear of the main wing $W_1$ and serves to impart directional stability and control to the airplane. The vertical stabilizer S is faired into the top of the fuselage by means of a tapered fin 10 which extends back from the transparent canopy 11 of the pilot's compartment 12.

The landing gear which is preferably of the so-called tricycle type, comprises two laterally spaced non-steerable main landing wheels 15 retractably carried from the lower surface of the fuselage F and positioned to the rear of the center of gravity of the airplane by suitable outwardly extending shock absorbing strut 16, and a forward landing wheel 17 preferably retractably carried from the nose of the fuselage by means of a suitable shock absorbing strut 18, said forward wheel being free to swivel about the axis of the supporting strut whereby the airplane can be steered on the ground by means of differential application of the brakes in the main wheels or by means of suitable linkage between rudder foot pedals and the forward strut column.

The engine for driving the propellers and various accessories is centrally located and housed within the fuselage in the position diagrammatically indicated by dotted lines 20, and transmission of power to a pair of outboard tractor propellers, carried on the leading edge of the main wing on either side of the fuselage, one of which is shown at 21, is accomplished by means of a pair of drive shafts 22 and 23 extending laterally from the engine gear box 24 and into the wings. The power from the shafts 22 and 23 is transmitted to the propellers through suitable gear and shaft combinations, one of which is best shown in Figures 2 and 3, and comprises an overrunning or so-called one-way clutch 25, a pair of suitable bevel gears 26 and 27, and an axially positioned propeller shaft 28 which is journaled in suitable bearings 29, 30 and 31 within the main wing $W_1$.

Also housed within the main wing, in one embodiment of the invention as best shown in sectional view in Figure 3, are boundary layer removal fans, one of which is shown at 35, mounted on a shaft 36 which is rotatably carried in suitable bearings 37 and 38 within the wing and driven by means of a gear train comprising driven pinion 39 fixed on the fan shaft 36 and a driving gear 40 fixed to the rearward extension 41 of the beforementioned propeller shaft 28. The overrunning clutch 25 is so constructed and arranged as to transmit torque through from the engine to the propeller shaft but upon reduction of the power output and speed of the engine below that required for propulsive effort by the propellers for a given air speed of the airplane the said propeller and the said boundary layer fan can continue to rotate at a higher speed than that corresponding with the engine speed or under so-called "free-wheeling" conditions. The overriding clutch may be of any suitable construction, for example the conventional automatically operating roller and cam type well known in the automotive industry.

The main wing $W_1$ is provided with ailerons 45, leading edge variable area slots 48, for lateral control, and trailing edge flaps 46 for modification of the lift characteristics of the wing. The said trailing edge flaps 46 are fixed to hollow torque tubes as shown at 47 by means of which they are pivotally hinged in the wing and are adapted to be rotated from their normal raised or fully retracted positions as shown in Figure 3 to their fully lowered position as shown in Figure 4, by means of motors located within the fuselage as shown at 50 in Figures 2 and 8 and acting through suitable worm and gear couplings 51 upon the inner root ends of said torque tubes 47.

Each of the trailing edge flaps as shown at 46 is provided with curved passageways or ducts as shown at 53 extending throughout its length, located to the rear of the said torque tube and extending through the flap from the top to the bottom surfaces. A rearward extension 55 of the lower wing skin surface forms a stationary strip or valve-like element which bridges and normally closes the lower openings to the said flap passages 53 when the flap is fully up as shown in Figure 3, thereby forming a closed and continuous lower surface to the trailing edge, but when the flap is lowered to the position shown in Figure 4 the tongue 55 swings into the flap passage, thereby opening a free air passageway therethrough from the lower surface to the top surface of the flap. When the flap 46 is in its fully raised position as shown in Figure 3, the flap passages 53 are in communication with the duct 56 within the wing structure on the suction side of the boundary layer removal fan 35 by way of a series of perforations 57 longitudinally spaced along the length of the rearward wall of flap torque tube and a series of oppositely positioned perforations 59 through the opposite forward wall of the torque tube. When the trailing edge flap is in a fully lowered position as shown in Figure 4, the strip 55 swings into the passageways 53 as before described, covering and closing off the said tube perforations 57 from connection with the said passageway; at the same position however the beforementioned series of perforations 59 are rotated from within the wing into an exposed position relative to the upper surface of the wing while another set of longitudinally spaced perforations 60 through the wall of the torque tube 47 is placed in communication with the beforementioned duct 56 leading to the suction side of the fan 35. In this arrangement the torque tube 47 is closed at the ends to confine the inward air flow to that removed through the perforations and flap slot.

The leading edge slots 48 of the main wing are constructed and preferably operated in conjunction with the trailing edge flaps 46 in the same manner as those of the forward wing $W_2$ hereinafter fully described, mainly in connection with Figures 2, 6 and 7.

In an optional arrangement as shown in Figure 10, instead of employing separate boundary layer fans in each wing, a single centrally located fan 65 within the fuselage may be employed, said fan being driven by the engine 20 through an axially positioned auxiliary shaft 66. The suction side of the said fan 65 is closed off from within the fuselage by means of a suitable bulkhead 67 and a Venturi shaped fan housing 68 to form a chamber 69 into which the inner root ends 70 and 71 of the before mentioned flap torque tubes 47 extend through suitable packing seals, one of which is best shown at 72 in Figure 9. With this arrangement the innermost perforations 60 as shown in Figures 3 and 4 may be omitted from the torque tube walls as shown in Figure 5 since communication with the boundary layer removal fan is in the latter arrangement effected entirely through the bore of the flap torque tube.

In the arrangement of Figure 2 in which individual fans are provided in each wing, each fan discharges into a laterally extending duct, one of which is shown at 75, which in turn communicates with a plurality of rearwardly directed boundary layer control slots as shown at 76 suitably placed in the forward region of the upper skin of the wing.

In the optional arrangement of Figure 10 the fan 65 discharges into a chamber 77 within the fuselage as defined by a suitable bulkhead through which the auxiliary drive shaft 66 passes through suitable sealing means 79 and by a pair of laterally extending ducts 80 and 81 interconnecting the said chamber 77 and the beforementioned boundary layer control slots as shown at 76 in the wing.

In either of the beforementioned boundary layer removal arrangements provision is made as best shown in Figures 8 and 9, for withdrawal of boundary layer air from the rear portion of the wing fillet adjacent the fuselage and in line with the flap hinge line. A slot 82 is provided in the wing fillet 83 which is placed in communication with the boundary removal fan by way of a perforation 84 in the flap torque tube 47.

In the forward part of the fuselage F is the beforementioned pilot's compartment as shown at 12 containing the pilot's seat 91 and a conventional wheel type control column 92 pivotally supported at its lower end at 93 in a suitable bearing mounting 94 fixed to the fuselage floor structure. A booster control servo-cylinder 95 suitably fixed to the fuselage structure at 96 and 97 is adapted to be controlled by means of a reciprocatable pilot rod 98 linked to the control column 92 at 99 and which extends into the cylinder to a differential control valve located in the piston 100. The booster-servo device may be any one of several types well known in the industry which operates preferably on the hydraulic principle and is adapted to amplify and transmit the amplified forces to the airplane control surfaces which are proportional to the forces applied by the pilot.

Fluid under pressure and controlled by the said differential valve actuates the said piston 100 which, in turn, through piston rod 101 and lever 102 serves as a booster to move and control the attitude of the horizontal stabilizer $W_2$ as more fully described hereinafter.

Referring now primarily to Figures 10 and 11, the forward wing or horizontal stabilizer $W_2$ is pivotally supported in its entirety upon a rotatable spanwise positioned tubular spar of compound construction comprising two concentric tubes 85 and 86. The exterior tube 85 of greatest diameter which is composed of two coaxial sections joined end to end by means of a special flanged connection as shown at 87 is rotatably supported within the fuselage upon a pair of oppositely positioned bearings, one of which is shown at 105 attached to the inside surface of the fuselage skin 106. The outer ends of the tube 85 extend only to the inner root ends of the horizontal stabilizer wing tips and the inner root ends of said wing tips are rotatably supported upon said tube 85 through suitable bearings, one of which is shown at 107 fixed to the inner rib 108.

The inner concentric tube 86 of smaller diameter makes a rotatable fit within the beforementioned outer tube 85 and extends outward from the ends of tube 85 into the horizontal stabilizer wing tips where it is non-rotatably fixed with respect to said wing by suitable flanged connections such as shown at 109 and 110 attached to the wing ribs 111 and 112.

The beforementioned special flanged connection 87 is formed with an inner annular shaped recess 114 adapted to house an annular flange 115 which is fixed to and forms a central portion of the innermost tube 86. The said flanged connection 87 also carries a lever arm 102 to which the beforementioned booster control piston rod 101 is pivotally attached at 103.

Fixed to the lever 102 and radially positioned with respect to the center of the flange coupling 87 is a hydraulic cylinder 116 containing a piston 117 and a piston rod 118 extending from the lower end thereof. The piston is adapted to be actuated by hydraulic pressure which may be applied to either end of the piston 117 through flexible tubular connections 119 and 120. The flange 87 is provided with a cam like recess 121 of semi-circular contour and having a centrally located depression 122 of approximately semi-cylindrical shape. The lower end of the beforementioned piston rod 118, which is provided with a semi-cylindrical shaped follower tip 123 adapted to bear on the cam surface 121 and to fit into the cam depression 122 extends into the recess 122 through a coaxial hole 124 in the periphery of the flanged connection 87.

A bevel gear 126 is fixed to the outer spar tube 85 intermediate the rib 108 and fuselage fillet 127 and meshes with a bevel pinion 128 which is carried on the forward end of a shaft 129 rotatably supported upon the inner side of wing rib 108 in a pair of bearings 130 and 131. The forward end of shaft 129 makes connection through a universal coupling 132 positioned at a point on the inner projection of the center line of the hinge of the trailing edge flap 135, to a second shaft 136 which in turn is rotatably supported on the inner side of the trailing edge flap rib 108 in bearing 137. The said shaft 136 terminates in a bevel pinion 138 which meshes with a bevel gear 139 fixed on the end of the hinge pin 140 of a trailing edge tab surface 141. The said trailing edge tap 141 is hinged at 142 and 143 and adapted to be swung at an angle above and below the level of the surfaces of the flap 135.

Referring now primarily to Figures 6 and 7, the forward wing W2 carries a semi-automatically operating variable area leading edge slot 145 comprising a movable leading edge slot 146 supported upon a plurality of rods, one of which is shown at 147 and each of which make a sliding fit in the forward portion of the airfoil in a pair of suitable supports as shown at 148 and 149 for limited longitudinal reciprocative movement. Figures 6 and 7 show the leading edge slot in its fully closed and fully opened positions respectively.

The trailing edge of the horizontal stabilizer is provided with slotted trailing edge flaps as shown at 135 constructed similar to those hereinbefore described in connection with the main wing W1. These slotted flaps 135 are pivotally mounted upon coaxial torque tubes as shown at 150 and 151 which are adapted to be rotated through the limited flap lowering angle as indicated, by suitable means such as by an electric motor 152 acting through a worm and gear drive located within the pivotable wing section in the position shown at 153 in Figure 2 and as best shown in section 153 in Figures 6, 7 and 11.

Eccentrically pivoted to the gear 154 at 155 is a linkage rod 156 which extends forward through the airfoil and through an opening 157 in the spar 86 to a lever 158 pivotally supported at 159 from the wing structure in a clevis 160. Extending from the pivot 159 and forming a unit with the lever 158 is a latch 161 adapted to catch and hold the tongue 162 of the leading edge slot supporting rod 147 when the trailing edge flap 135 is up as shown in Figure 6, and to release said tongue and the leading edge slot mechanism associated therewith when the trailing edge flap is fully lowered as shown in Figure 7.

In the forward wing W2 the trailing edge flap 135 may have the same construction as that of the main wing as shown in Figure 4 and provision accordingly made for withdrawing the boundary layer through the perforations in the torque tube and into the interior sealed cavity 163 of the airfoil as best shown in Figures 4, 6 and 7, and thence through a plurality of perforations as shown at 164 and 165 into the tubular spar 86. From there the air flows inwardly toward the fuselage through the tubular spars 85 and 86 and through a plurality of registering perforations in tube 85 and 86 as shown at 166, to the longitudinal passages shown as 169 and 170 on each side of the fuselage adjacent the fuselage skin surface and thence rearwardly to the suction duct 69 of the beforementioned boundary layer removal fan 65 thence to be finally exhausted through the plurality of main wing slots 76 as before mentioned.

The operation is as follows:

The airplane while at rest on the ground and at the start of the take-off run is initially in the attitude substantially as shown in Figure 1. During the take-off run the main wing trailing edge flaps 46 may be maintained in a full-up position or if desired to reduce the take-off run and speed they may be partially lowered to increase the maximum coefficient of lift of the main wing W1. Upon approaching minimum flying speed the forward wing W2 is pivoted by pulling back on the control column, to increase its angle of attack while at the same time the trailing edge flap may be partially lowered by means of the motor 153 to a position preferably intermediate that shown in Figures 6 and 7 at which position the leading edge flap will be released for automatic action. As the lift on the forward wing W2 is thus increased the load on the landing gear will be gradually reduced until the forward wheel 17 is raised off the ground thereby increasing the angle of attack of the main wing sufficient to effect a take-off from the ground surface. During the initial high angles of attack of the forward wing the leading edge slot will, upon lowering the trailing edge flap and the resultant releasing of the latch 161, automatically move forward to open the variable slot 145 thereby increasing the angle of incidence to which the forward wing may be moved without stalling. Thus by the combined use of the trailing edge and leading edge slots the maximum effective coefficient of lift of the forward wing may be greatly increased to the value necessary for adequate control. As the airplane gains a margin of flying speed immediately following the take-off the angle of incidence of the forward wing may then be reduced and the resultant increase in air pressure at the leading edge immediately effects automatic closing of the leading edge slot. Subsequent raising of the trailing edge flap actuates the latch mechanism to lock the said leading edge slot closed during normal high speed flight. The trailing edge flap of the main wing may then also be raised to its normal full-up position.

In the landing maneuvers of the airplane the before described operations are, in substance, reversed; however, in landing, the degree to which these controls are employed is, in general, greater than that for take-off. For example, as the air speed is reduced preparatory to landing, the trailing edge flaps of the main wings may be lowered to the extreme positions shown in Figure 4 to effect a maximum possible coefficient of lift of the said main wing and at the same time to effect a maximum drag coefficient. In so doing, the effective center of lift of the main wing will be moved rearward thereby placing an increased diving moment upon the aircraft. Due to the combined effect of this increased diving moment and to the inherently more rapid falling off of the lift of the low aspect ratio forward wing with decreasing speed, it is then necessary in order to maintain stability at the increased angles of attack and accompanying reduced speeds to greatly increase the maximum effective coefficient of lift of the forward wing and also the maximum angle of incidence at which its lift can be maintained. This is then accomplished by fully lowering the trailing edge flaps of the forward wing, releasing the leading edge slots and increasing the effective angle of attack of the entire forward wing, carrying said flap and leading edge slot. The accompanying boundary layer control on either or both the main and forward wings further augments their high lift characteristics and prolongs the control of the aircraft at reduced speeds.

For full control of the airplane under all conditions it may be desirable to provide for rotation of the forward wing through an angle of approximately +20° to —20° with respect to the longitudinal axis of the airplane as indicated in Figures 6 and 7.

Preparatory to flight operations hydraulic pressure is initially applied to the top of cylinder 116 through tube 119 from a suitable pressure source to force the piston 117 and piston rod 118 downward. The resultant pressure between the follower 123 and the cam surface 121 will cause relative angular rotation between the flange 115 of the tube 86 and the flanged housing 87 of the tube 85 until the said follower 123 falls into the depression 122 thus locking the two tubular spars 85 and 86 together against further relative angular displacement. Control forces now applied to the lever 102 through the booster control rod 101 will be tortionally transmitted directly through both of the concentric tubular spars 85 and 86 to the horizontal stabilizer wings. During low speed maneuvers such as at take-off the entire horizontal stabilizer is preferably directly connected through for positive and rapid pivotal movement.

During flight at intermediate airspeeds as after attaining a margin of speed following take-off or during prolonged cruising at speeds of maximum economy during which time a maximum degree of stability and ease of control is desirable the control of the horizontal stabilizer may be shifted to an indirect application of controlling forces as follows: The formerly applied hydraulic pressure is released from the top of cylinder 116 through line 119 and applied to the lower end of said cylinder through line 120 to raise the piston rod 118 upward to release the cam 121 from the follower 123.

The flange 115 is thus unlocked from the housing 87 to allow relative angular rotation between the spar tubes 85 and 86 through an angle $a$ as determined by the width of the cam surface depression 121. At the highest position of the piston 117 in the cylinder 116 the cam follower 123 extends into the cam cavity within the housing 87 to prevent relative rotation between flange 115 and said housing 87 exceeding that determined by the width of said cam depression. Under these conditions the horizontal stabilizer and the spar tube 86 upon which it is carried is free to pivot and to float in the relative air stream within the angular limits just mentioned which are preferably approximately from +20° to —20° with respect to the longitudinal axis of the fuselage.

Now, movement of the control subsequent to such release results in rotation of the outer spar tube 85 relative to the inner tube 86 which will further result in rotation of bevel gear 126 with respect to the bevel pinion 128 thus imparting through shafts 129 and 136 and through gears 138 and 139 angular displacement to the trailing edge tab 141. By this means the said tab 141 is operated to control the angle of attack of the freely floating horizontal stabilizer. Under such conditions the airplane is exceedingly stable in pitch by reason of the constant coefficient of lift maintained by the floating stabilizer for any given tab setting.

At higher air speeds approaching sonic velocities it may be desirable to again return the controls to the direct locked connection with the booster system for the reason that, as before stated, trailing edge flaps tend to become ineffective means for varying the coefficient of lift of an airfoil under the critical air flow conditions encountered at such speeds.

Boundary layer removal may be applied to either or both of the wings $W_1$ or $W_2$ as desired. As shown in Figures 2, 3, 7 and 8, the boundary layer is removed from the upper surface of the main wing $W_1$ by means of the removal fan 35. When the trailing edge flaps 46 are up as shown in Figure 3, the boundary layer air is drawn into the upper opening of slot 53 and thence through perforations 57 and 59 into the fan inlet or suction chamber 56 in the wing. From fan 56 the air is exhausted into the lateral duct 75 and thence discharged rearwardly over the outer upper surface of the wing through the rearwardly directed discharge slots 76.

When the trailing edge flap is in a fully lowered position as shown in Figures 4 and 7, the boundary layer air is withdrawn from the top of the wing through the plurality of torque tube perforations exposed at 59 and thence through perforations 60 to the suction of the boundary layer removal fan 35 and out as before described. In this fully lowered position the slot 53 is cut off from the torque tube perforations 57 as best shown in Figure 4 and the slot 53 opened by the inward swing of the torque 55 to allow airflow through from the lower surface of the wing to the upper surface of the trailing edge flap.

The boundary layer removal fan 35 is normally driven at high speed by the engine 20 through the laterally extending propeller drive shafts 23, clutch 25 and the gears 26, 27, 39 and 40, within the wing.

In case of engine failure or in any event during the gliding approach and landing maneuvers when the engine is either stopped or is idling, provision is made in the present invention for maintaining a continuation of the effective operation of the boundary layer removal apparatus. Referring again to Figures 2 and 3, in event of such engine failure or engine idling, the overriding clutches as shown at 25 in the lateral drive shafts 22 and 23 acts to cut the engine out of driving connection with the propellers and to allow the propellers to continue rotation in the relative air stream in a so-called "free wheeling" relationship with respect to the engine. Under such conditions the propeller is free to act as a wind driven motor absorbing power from the airstream and delivering it through the propeller shaft 28—41, gear 40 and pinion 39 and through shaft 36 to the boundary layer removal fan 35. The ratio of the gears 40 and 39 is preferably such as to step up the speed of the fan with respect to the propeller, and in this connection the propeller is preferably of a controllable pitch type in which the pitch of the blades may be adjusted by the pilot during flight to obtain the required torque and power input for the proper boundary layer removal fan operation. This is desirable since the propeller blade setting for efficient propulsion in normal flight is usually not the best setting for proper operation of the propeller as a wind driven power producing machine.

In the optional arrangement for boundary layer air removal as best shown in Figures 10 and 11, the single boundary layer removal fan 65, located centrally in the fuselage, is adapted to be driven by the longitudinally positioned auxiliary shaft 66 extending from the gear box 24 of the engine 20. The boundary layer air in this optional arrangement is withdrawn into the flap torque tubes through slot 53 and perforations 57 and 59, in the manner before described in connection with Figures 4, 6 and 7. However, in this modified arrangement the perforations 60 are omitted and a flap 171 provided adjacent the flap hinge to close the perforations 59 from communication with the interior of the wing as best shown in Figure 5. The boundary layer air which thus enters the torque tube flows inward toward the fuselage through the flap torque tubes and through the innermost open root ends 70 and 71 of the said torque tubes into the suction inlet chamber 59 of the fan 65.

The boundary layer air from fan 65 is discharged at increased pressure into the chamber 77 from which it is conducted out through the lateral ducts 80 and 81 and discharged through the rearwardly directed boundary layer control discharge slots as shown at 76.

In the forward wing $W_2$ the boundary layer may be removed from the upper surface of the wing by withdrawal into the interior portion of the wing through perforations in the flap torque tube in the manner described for the main wing in connection with Figures 2, 3 and 4. As best shown in Figures 6, 7 and 11 the thus withdrawn boundary layer is exhausted from the said interior of the forward wing $W_2$ through a series of suitable perforations in the tubular spar 86 as shown at 164 and 165 and thence inward through the tubular spar to the registering ports 166 in tubes 85 and 86 and from these into the beforementioned longitudinal passages 169 and 170 on either side of the fuselage which lead rearwardly to the opening 175 into the suction chamber 69 of the boundary layer removal fan 65.

Removal of the boundary layer air not only from the upper surface of the wing but also from the upper fillet provided at the point of intersection of the wing with the fuselage, as shown in Figures 8 and 9, has been found to be effective in delaying incipient stalling conditions of the airflow over the entire upper surface of the wing at high angles of attack. This appears to be due to the fact that the region of the wing root adjacent the fuselage is the most critical one and the point from which initial stalling conditions progress to the other portion of the wing.

Hence delay of stalling at the wing root delays the stalling of the entire wing. The boundary layer air removal may be advantageously utilized in connection with the wings and wing fillets of either or both the main wing or the forward horizontal stabilizer.

Some of the advantages of the present invention are: the landing or stalling effective coefficient of lift of the airplane as a whole is increased over that of more conventional types by reason of the fact that the controlling force on the forward horizontal stabilizer is a positive lifting force as compared to the downward tail load on the conventional rearward tail type of airplane; similarly in the present invention the horizontal stabilizer trimming load for steady flight conditions is in the same direction as the main wing load thus rendering the wing load factor always less than the airplane load factor. The opposite of this condition obtains in a conventional airplane where the wing load must also include the lift equivalent of an opposing tail load. Control at take-off is improved due to the fact that when the nose is lifted by the forward horizontal stabilizer, the reaction on the main wing is immediately reduced and is much smaller than on an ordinary tricycle landing gear airplane of conventional wing arrangement where a down load must be initially applied behind the main gear. This not only reduces the amount of trim adjustment required to attain a take-off attitude, but also reduces the load on the wheels and the accompanying drag.

Other advantages reside in the novel manner of employment of boundary layer control as hereinbefore described to increase the speed range and also the efficiency of flight of the airplane, and in the novel variable stabilizer whereby maximum positiveness in longitudinal control with minimum effort may be accomplished.

The foregoing is merely illustrative of the apparatus and method of operation of the invention and is not to be limiting. The invention includes any apparatus and method which accomplishes the same results within the scope of the claims.

I claim:

1. In an airplane, the combination comprising: a fuselage, a main supporting wing rigidly attached to said fuselage, a forward wing having an area and aspect ratio substantially less than said main wing and located a substantial distance ahead of said main wing, means providing a forwardly-located, spanwise wing axis about which said forward wing may turn to vary its angle of incidence, a pilot operated control lever, means operably connecting said lever to said forward wing for positively controlling the angle of incidence of the latter, means for disconnecting said connecting means so that said forward wing may freely turn about said axis and thereby enable the angle of incidence of said forward wing to be automatically varied with respect to said fuselage by the relative air stream to maintain a substantially constant angle of attack, and means to vary the position of the effective center of lift of said forward wing with respect to the pivotal support whereby the angle of attack of said forward wing may be varied.

2. In an airplane, the combination according to claim 1, in which the means to vary the position of the effective center of lift of said forward wing comprises a controllable trailing edge trimmer.

3. In an airplane, the combination according to claim 1, in which the means to vary the position of the effective center of lift of said forward wing comprises a controllable trailing edge trimmer, and the pilot operated control lever and connecting means associated with said control lever and said forward wing are so organized as to enable transfer of the connection from said lever to either said trimmer or said forward wing whereby the angle of attack of said forward wing may be either automatically or positively controlled.

WILLIS M. HAWKINS.

REFERENCES CITED

The following references are of record in the file of this patent:

UNITED STATES PATENTS

| Number | Name | Date |
| --- | --- | --- |
| 1,879,717 | Sikorsky | Sept. 27, 1932 |
| 1,913,644 | Stalker | June 13, 1933 |
| 1,922,167 | Leray | Aug. 15, 1933 |
| 2,041,795 | Stalker | May 26, 1936 |
| 1,861,318 | Page | May 31, 1932 |
| 2,272,664 | Gropler | Feb. 10, 1942 |
| 2,289,704 | Grant | July 14, 1942 |
| 2,271,226 | Johnson | Jan. 27, 1942 |
| 1,747,334 | Sundstedt | Feb. 18, 1930 |
| 1,830,122 | Milburn | Nov. 3, 1931 |
| 1,915,809 | Welsher | June 27, 1933 |
| 2,104,006 | Ballou | Jan. 4, 1938 |
| 2,117,607 | Griswold | May 17, 1938 |

FOREIGN PATENTS

| Number | Country | Date |
| --- | --- | --- |
| 209,435 | Great Britain | Nov. 27, 1924 |
| 471,177 | Great Britain | Aug. 30, 1937 |
| 850,410 | France | Sept. 11, 1939 |
| 497,969 | Great Britain | Jan. 2, 1939 |
| 518,663 | Great Britain | Mar. 5, 1940 |